United States Patent Office 3,268,527
Patented August 23, 1966

3,268,527
PROCESS FOR 2,4-DIALKYL-6-ISOPROPOXY-s-TRIAZINE
Erwin Richard Ruckel, Westfield, N.J., assignor to American Cyanamid Company, Stamford, Conn., a corporation of Maine
No Drawing. Filed June 28, 1963, Ser. No. 291,264
7 Claims. (Cl. 260—248)

The present invention is concerned with the preparation of 2,4-dialkyl-6-alkoxy-s-triazines and with their use in an improved process for the preparation of 2,4-dialkyl-6-sulfanilamido-s-triazines. More particularly, it relates to reacting a Grignard reagent of the formula RMgX, in a solvent medium with an s-triazine of Formula I in Step A of the following reaction scheme to obtain an s-triazine of Formula II which is reacted in Step B with sodium sulfanilamide to obtain s-triazines of Formula III.

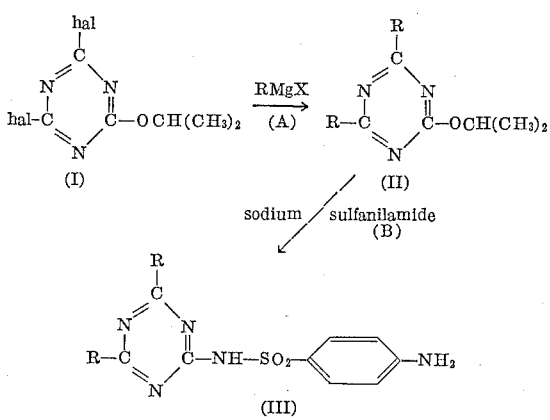

wherein in the foregoing Formulae I, II and III, R is a lower alkyl of 1–4 carbons; X is usually chlorine or bromine, less often iodine; and (hal) is usually chlorine or bromine but may be iodine.

In the past, a number of sulfonamido compounds such as those of Formula III, above, particularly those in which R is a lower alkyl radical of one to four carbon atoms, have become known for use as "sulfa" drugs. Of particular interest for this purpose, for example, is 2,4-diethyl-6-sulfanilamido-s-triazine, the compound of Formula III, when each "R" is ethyl.

Such compounds of Formula III are prepared by the known reaction of a suitable 2,4-dialkyl-6-alkoxy-s-triazine with sodium sulfanilamide. In that reaction the 6-alkoxy substituent is replaced by the sulfanilamido group. However, development and use of the products of (III) have been hindered in the past by the difficulty of preparing a suitable intermediate. For example, the 2,4-diethyl-6-sulfanilamido-s-triazine, noted above, requires as an intermediate a 2,4-diethyl-6-alkoxy-s-triazine. An involved synthesis is required to obtain the intermediate.

Perhaps the best previously-available process for 2,4-dialkyl-6-alkoxy-s-triazines involved the multiple steps of the following reaction sequence:

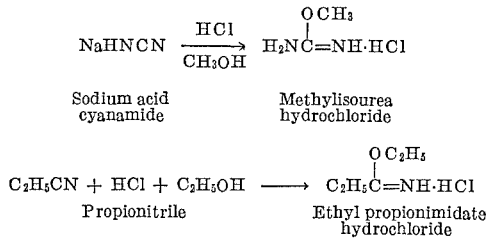

→ $\underset{\text{Ethyl propionimidate hydrochloride}}{\overset{OC_2H_5}{\underset{|}{C_2H_5C}}=NH \cdot HCl} \xrightarrow{K_2CO_3} \underset{\text{Ethyl propionimidate}}{\overset{OC_2H_5}{\underset{|}{C_2H_5C}}=NH}$ $3C_2H_5\overset{OC_2H_5}{\underset{|}{C}}=NH + H_2N\overset{OCH_3}{\underset{|}{C}}=NH \cdot HCl \longrightarrow$ $\underset{C_2H_5-C\underset{N}{\overset{N}{\diagdown}}\underset{N}{\overset{C_2H_5}{\diagup}}C-OCH_3}{} + C_2H_5\overset{NH}{\underset{||}{C}}-NH_2 \cdot HCl + 3C_2H_5OH$ Moreover, these reactions are not readily carried out and some of the intermediate stage products are not too stable. By comparison, the one-step reaction of Step A above according to the present invention offers a far simpler and more satisfactory route to compounds of (III).

As shown in my copending application with Henryk Bader, Serial No. 291,265, filed June 28, 1963; 2,4-dihalo-s-triazines of Formula I above wherein the substituent in the 6-position is methoxy-, ethoxy- or n-propoxy-, in methylene chloride, may be reacted with a Grignard reagent according to Step A above.

This use of a chlorinated aliphatic-hydrocarbon solvent medium, such as methylene chloride, did produce useful results. Unfortunately, the alkoxy group in the 6-position can also be reacted with the Grignard reagent. This was found to occur to a greater extent than was desirable in the overall process.

It is therefore an object of the present invention to decrease this objectionable production of trialkyl-s-triazines and other by-products in Step A. Surprisingly, this has been accomplished by the unexpected discovery that isopropoxy in the 6-position is non-reactive to the degree that Step A produces a greatly improved yield of the desired s-triazine of Formula II above.

A Grignard reagent is prepared in the usual way, utilizing a suitable solvent normally employed for the purpose. However, the resultant solution is not used directly as the reaction medium. Instead, a starting triazine of (II) above is separately dissolved in a suitable solvent and the two solutions are then combined to form the reaction medium. As solvent for the triazine, a halogenated aliphatic hydrocarbon such as methylene chloride is preferred. However, if necessary or desirable, other solvents such as toluene, tetrahydrofuran, and the like may be used. Resulting reaction not only produces a better yield of desired product, but reduced amounts of side reaction products.

As so described, however, the simplicity of the procedure is more apparent than real. A number of factors must be given careful consideration and control. Otherwise, optimum results are not obtainable. Accordingly, each will be considered separately.

In this discussion it should be understood that the term "Grignard reagent" means the well-known alkyl magnesium halides of the formula RMgX. They are prepared by standard and well-known procedures using a suitable alkyl halide having the desired value for "R." Although the process of this invention is not limited thereto, of primary interest are compounds produced when R is lower alkyl.

As defined generally, above, "R" may be alkyl of from 1 to 18 carbon atoms, of either branched or straight chains, such as methyl, ethyl, propyl, decyl and octadecyl.

The halide usually will be a bromide or chloride, less often an iodide. Useful halides include, for example, methyl chloride, ethyl bromide, n-propyl iodide, isopropyl bromide, secondary butyl bromide, tertiary butyl chloride, n-hexyl iodide, 1,1-diethyl-n-propyl bromide, and the like. The Grignard reagent may be prepared in a solvent normally used for this purpose, e.g., diethyl ether, di-n-butyl ether, tetrahydrofuran and the like. The preferred solvents are diethyl ether and tetrahydrofuran.

Either mode of mixture of reactant, addition of solution of s-triazine to Grignard solution or vice versa, is satisfactory. As to the chlorinated aliphatic hydrocarbon solvent or suspending medium in which the starting triazine is placed, before addition thereto of the Grignard reagent, methylene chloride is preferred for several reasons. Other methylene halides are not as readily available. Longer alkylene chain halides are generally not as effective in solvent power for the triazine and are less readily evaporated.

Methylene chloride should be present in amount at least half of the total solvent volume of the reaction medium. Below this amount, the yield of dialkyl-s-triazines falls off, the decrease being very appreciable when as little as 30% is present. As a maximum there is no particular limit. In general, amounts of from about 50% to about 80% of the total solvent volume is good practice.

As to the reactant proportions, they are not critical. It is found that about one molecular equivalent of the Grignard reagent coordinates with the s-triazine without further participation. Too great an excess, however, seems to favor the competing side reactions. A good practice is to add about 2.5 to about 3.5 mols of the Grignard reagent per mol of s-triazine.

Conducting the reaction at temperatures below 0° C. is very important. While monoalkyl-s-triazines can be prepared at temperatures above 0° C., the next alkylation step is favored by low temperatures. Above about 0° C. competing reactions are faster than the second alkylation; below 0° C. the side reactions occur to less extent than does the second alkylation. In general, the reaction temperature range should be between about 0° C. and about minus 20° C. Lower temperatures can be used but the advantages do not offset the difficulty.

Control of reaction time is essential to obtaining optimum results. By the time the second alkylation has taken place and the isopropoxy-dialkyl-s-triazine has formed, it tends to quaternize with itself, forming a polymer. For any one set of reaction conditions such as volume, temperature, stirring efficiency and the like, there is an optimum time. Exact limits cannot be set to cover all such combinations. In general, however, reaction periods of from about two to about six hours will constitute good practice.

When the reaction is completed, as indicated by the disappearance of the Grignard reagent according to well-known test procedures, the products are separated from the reaction mixture by any convenient method. This may include the addition of water to the reaction mixture, followed by separation of the organic solvents containing the products of the reaction.

The invention will be further illustrated in conjunction with the following examples. Therein all parts and percentages are by weight and temperatures are in degrees centigrade, unless otherwise noted. Parts by volume are to the parts by weight as milliliters and grams of water are to each other.

*Example 1*

To 260 parts by volume of a 3.46 molar solution of ethylmagnesium chloride (0.90 mole) in tetrahydrofuran, there is slowly added 62.4 parts (0.30 mole) of 2,4-dichloro-6-isopropoxy-s-triazine in 600 parts of methylene chloride at a temperature in the range of minus 15°±4° C. The reaction mixture is stirred for about 6 hours, whereupon 120 parts of water is added and the organic solution is collected. Evaporation of the solvent gives 32.6 parts of material analyzing 73.8% of 2,4-diethyl-6-isopropoxy-s-triazine (41.2% yield).

*Example 2*

To illustrate the advantages of an isopropoxy substituent in the 6-position, the procedure of Example 1 was repeated substituting an equimolar amount of 2,4-dichloro-6-methoxy-s-triazine for the 6-isopropoxy-s-triazine. The product contained only 42% of the 2,4-diethyl-6-methoxy-s-triazine, a yield of only 26%.

I claim:

1. In a process for the preparation of a dialkyl-s-triazine which comprises reacting a Grignard reagent of the formula RMgX, where R is lower alkyl and X is selected from the group consisting of chlorine, bromine and iodine, with a 2,4-dihalo-s-triazine; the improvement which consists in carrying out the reaction using an s-triazine of the formula

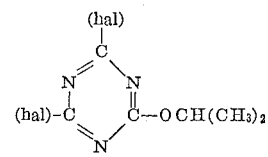

wherein (hal) is a halogen.

2. A process according to claim 1 in which (hal) is chlorine.

3. A process according to claim 1 in which (hal) is bromine.

4. A process according to claim 1 in which R is ethyl and (hal) is chlorine.

5. A process according to claim 1 in which R is ethyl and (hal) is bromine.

6. A process according to claim 1 in which a solution of the Grignard reactant in the solvent in which it is prepared is combined with a solution of the s-triazine in methylene chloride to form the reaction mixture.

7. A process according to claim 6 in which the reagent mixture is agitated at ambient temperature until substitution of both "R's" is substantially completed and thereafter the reaction stopped before quaternization of a substantial amount of the resultant product occurs.

References Cited by the Examiner

UNITED STATES PATENTS 3,083,242  3/1963  Ramsden _____ 260—248 XR

OTHER REFERENCES

Kharasch and Reinmuth: "Grignard Reactions of Nonmetallic Substances," Prentice-Hall Inc., New York (1954), pages 1046–1059.

WALTER A. MODANCE, *Primary Examiner.*

JOHN M. FORD, *Assistant Examiner.*